United States Patent
Holbert et al.

(10) Patent No.: US 7,192,640 B2
(45) Date of Patent: Mar. 20, 2007

(54) PAPERBOARD SUBSTRATE FOR BLISTER PACKAGING

(75) Inventors: Victor P. Holbert, Loveland, OH (US); David Reed, Blanchester, OH (US)

(73) Assignee: International Paper Company, Memphis, TN (US)

( * ) Notice: Subject to any disclaimer, the term of this patent is extended or adjusted under 35 U.S.C. 154(b) by 0 days.

(21) Appl. No.: 10/355,038

(22) Filed: Jan. 31, 2003

(65) Prior Publication Data

US 2003/0148110 A1    Aug. 7, 2003

Related U.S. Application Data

(60) Provisional application No. 60/352,853, filed on Feb. 1, 2002.

(51) Int. Cl.
*B32B 27/08*    (2006.01)
*B32B 27/10*    (2006.01)
*B32B 27/30*    (2006.01)
*B32B 27/32*    (2006.01)
*B32B 27/34*    (2006.01)
*B32B 27/36*    (2006.01)
*B32B 27/40*    (2006.01)

(52) U.S. Cl. .............. 428/349; 428/346; 428/347; 428/352; 428/353; 428/355 EN; 428/355 AC; 428/423.1; 428/425.1; 428/425.5; 428/446; 428/447; 428/448; 428/449; 428/452; 428/474.7; 428/475.5; 428/475.8; 428/476.3; 428/479.3; 428/480; 428/481; 428/507; 428/511; 428/512; 428/513; 428/514; 428/515; 428/516; 428/517; 428/519; 428/520; 428/521; 428/522; 428/523

(58) Field of Classification Search ............... 428/511, 428/478.8, 486, 483; 427/288, 428

See application file for complete search history.

(56) References Cited

U.S. PATENT DOCUMENTS

| 2,796,985 | A |   | 6/1957  | Gorton              |
|-----------|---|---|---------|---------------------|
| 2,802,569 | A |   | 8/1957  | Massey              |
| 2,866,544 | A |   | 12/1958 | Klein et al.        |
| 2,884,127 | A |   | 4/1959  | Neary               |
| 2,993,590 | A |   | 7/1961  | Denton              |
| 3,062,366 | A |   | 11/1962 | Palmer              |
| 3,152,922 | A | * | 10/1964 | McLaughlin et al ........ 428/452 |
| 3,246,747 | A |   | 4/1966  | Blish               |
| 3,248,842 | A |   | 5/1966  | Peppler             |
| 3,259,507 | A | * | 7/1966  | Smith ........................ 426/127 |

(Continued)

FOREIGN PATENT DOCUMENTS

DE    2556002    12/1975

(Continued)

OTHER PUBLICATIONS

Schimtz, Peter et al., "Films." Ullmann's Encyclopedia of Industrial Chemistry, 5th Ed., vol. A11 (1988), pp. 85-95, 108-110.*

*Primary Examiner*—Vivian Chen
(74) *Attorney, Agent, or Firm*—Matthew M. Eslami

(57) ABSTRACT

A packaging laminate comprising a paperboard substrate for providing a base layer, a tear-resistant polymer layer applied to said substrate, and a heat seal polymer layer applied to said tear-resistant polymer. This laminate structure is particularly useful for blister pack packaging.

16 Claims, 3 Drawing Sheets

U.S. PATENT DOCUMENTS

| | | | |
|---|---|---|---|
| 3,616,898 A * | 11/1971 | Massie | 206/216 |
| 3,652,725 A * | 3/1972 | Diaz et al. | 525/95 |
| 3,942,640 A * | 3/1976 | Hellstrom | 206/469 |
| 3,972,467 A * | 8/1976 | Whillock et al. | 428/213 |
| 4,469,258 A * | 9/1984 | Wright et al. | 229/123.1 |
| 4,842,141 A | 6/1989 | Segal | |
| 4,901,858 A | 2/1990 | Anderson | |
| 4,946,743 A | 8/1990 | Winter | |
| 4,972,953 A * | 11/1990 | Friedman et al. | 206/459.1 |
| 5,116,649 A * | 5/1992 | Massouda | 428/34.2 |
| 5,172,812 A * | 12/1992 | Wharton et al. | 206/531 |
| 5,407,751 A | 4/1995 | Genske et al. | |
| 5,458,933 A * | 10/1995 | Suskind | 428/34.2 |
| 5,469,968 A | 11/1995 | Matthews et al. | |
| 5,470,594 A | 11/1995 | Di Mino | |
| 5,486,390 A | 1/1996 | Burns et al. | |
| 5,518,790 A | 5/1996 | Huber et al. | |
| 5,567,986 A | 10/1996 | Ishida | |
| 5,612,105 A | 3/1997 | Okamoto et al. | |
| 5,667,886 A * | 9/1997 | Gough et al. | 428/331 |
| 5,758,774 A * | 6/1998 | Leblong | 206/531 |
| 5,775,512 A | 7/1998 | Jones et al. | |
| 5,927,500 A | 7/1999 | Godfrey et al. | |
| 6,006,913 A | 12/1999 | Ludemann et al. | |
| 6,010,784 A * | 1/2000 | Peterson | 428/354 |
| 6,133,168 A * | 10/2000 | Doyle et al. | 442/76 |
| 6,155,423 A * | 12/2000 | Katzner et al. | 206/531 |
| 6,270,610 B1 * | 8/2001 | Benoit et al. | 156/220 |
| 6,302,321 B1 * | 10/2001 | Reese et al. | 229/123.1 |
| 6,663,977 B2 * | 12/2003 | Kurian et al. | 428/480 |
| 2002/0050119 A1 * | 5/2002 | Gatewood et al. | 53/396 |
| 2003/0091847 A1 * | 5/2003 | Hawes et al. | 428/500 |
| 2003/0148110 A1 * | 8/2003 | Holbert et al. | 428/422.8 |

FOREIGN PATENT DOCUMENTS

| | | |
|---|---|---|
| DE | 25 56 002 | 7/1976 |
| EP | 0 148 020 | 7/1985 |
| EP | 0332742 | 10/1988 |
| EP | 0 332 742 | 9/1989 |
| EP | 0532766 | 4/1992 |
| EP | 0 532 766 | 3/1993 |
| EP | 0847921 | 12/1997 |
| EP | 0 847 921 | 6/1998 |
| GB | 2151581 A | 7/1985 |
| JP | 06-305086 * | 11/1994 |

* cited by examiner

PAPERBOARD SUBSTRATE FOR BLISTER PACKAGING

This application claims the benefit of provisional application No. 60/352,853, filed Feb. 1, 2002.

BACKGROUND OF THE INVENTION

Blister packs are formed by a substrate, such as paperboard, with a plastic layer sealed to the substrate. The plastic layer has bubbles or compartments conforming to the size and shape of the product being packaged. Pharmaceutical products, such as tablets, are often packaged in blister packs with each tablet individually held within a bubble.

As is a common problem with pharmaceuticals in any type of packaging, the packaging must be accessible by the person using the medication, but also be child-resistant. This poses problems, particularly when the recipient of the medication is lacking manual dexterity or strength.

It is an object of the invention to provide a laminated paperboard substrate for packaging that is child-resistant, yet easily opened by the intended consumer.

It is another object of the invention to provide a laminated paperboard substrate for packaging wherein the strength needed to open the package can be controlled.

It is yet another object of the invention to provide a laminated paperboard substrate for a blister package that does not adhere to chill rolls during manufacture.

It is another object of the invention to provide a substrate that easily bonds to blister material including PVC, Aclar, and PET.

It is another object of the invention to provide a package which is inexpensive to manufacture.

These and other objects of the invention will become apparent after review the disclosure of the invention.

SUMMARY OF THE INVENTION

A packaging laminate is formed by a paperboard substrate with a plastic blister layer sealed to the substrate. The packaging laminate comprises a paperboard substrate for providing a base layer, a tear-resistant polymer layer applied to said substrate, and a heat seal polymer layer applied to said tear-resistant polymer. This laminate structure is particularly useful for blister pack packaging. A series of instructions must be followed in order to access the contents of the blister package due to the presence of the tear-resistant layer. The tear strength can be controlled by modulating the levels of adhesion of the tear-resistant polymer to the paperboard by one of several methods. A patterned coating of adhesion primer can be applied to the paperboard. Also, a patterned coating of an adhesion inhibitor may be applied to the paperboard. Alternatively, the molten polymer stream forming the tear-resistant layer may be applied to the paperboard from the extrusion die with a patterned nip roll. The use of such modulated adhesion allows for higher tear strength in the body of the package and a lower level in specific areas defined by the package design and geometry. This allows the intended consumer to easily access the contents of the blister pack while still forming a child-resistant layer.

DETAILED DESCRIPTION OF THE INVENTION

Figure 1:
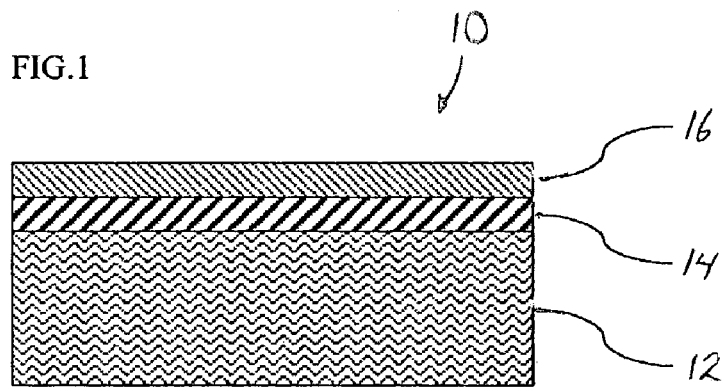
FIG. 1 is a view of the laminate comprising the blister pack substrate.

A laminate used to make the substrate of a blister pack is shown in FIG. 1. The packaging laminate comprises a paperboard substrate for providing a base layer, a tear-resistant polymer layer applied to said substrate and a heat seal polymer layer applied to said tear resistant polymer. Paperboard layer 12 provides the base layer of the substrate and a tear-resistant polymer layer 14 is applied to the paperboard to provide a child-proof resistance to opening. Paperboard layer 12 is most suitably high grade paperboard stock, for example, 100–300 lbs. or higher sized carton board. A heat seal polymer layer 16 is applied as the outer layer of the laminate and provides a good bonding surface for the plastic blister layer.

The tear-resistant polymer layer 14 may be polyamides, such as nylon 6, nylon(6,6), nylon(6,12) or other polyamides, polyester, polyurethane, block copolymer, unsaturated block copolymers such as styrene-butadiene-styrene, styrene-isoprene-styrene and the like; saturated block copolymers such as styrene-ethylene/butylene-styrene, styrene-ethylene/propylene-styrene, and the like) or other material possessing high tear-resistant properties. The polymer used to make the tear-resistant layer may be blended with another polymer selected from the group including ethylene copolymers such as ionomers, vinyl acetate, methylacrylic or acrylic acid copolymers.

Film weights for the tear-resistant polymer layer may be from 2 to 50 pounds per 3000 ft$^2$ with a preferred weight of 5 to 30 pounds per 3000 ft$^2$.

Blends of tear resistant polymers including from 60 to 100 weight percent of polyamide, such as nylon 6, nylon(6,6), nylon(6,12) or other polyamides, polyester, polyurethane, block copolymer, unsaturated block copolymers such as styrene-butadiene-styrene, styrene-isoprene-styrene and the like; saturated block copolymers such as styrene-ethylene/butylene-styene, styrene-ethylene/propylene-styrene, and other material possessing high tear-resistant properties, and blended with 0 to 40 weight percent of other polymers comprising ethylene copolymers such as ionomers, vinyl acetate, methylacrylic or acrylic acid copolymers.

The heat seal polymer layer 16 is formed by a material exhibiting excellent heat seal properties to PVC, Aclar, PET and other materials used to make the blister layer. The heat seal polymer layer is chosen from a group consisting of EVA, EMA, ionomers, acrylic copolymers, acrylate copolymers and modified versions of the like.

Film weights for the heat seal polymer layer may be from 3 to 15 pounds per 3000 ft$^2$ with a preferred weight of 8 pounds per 3000 ft$^2$.

The heat seal polymer can incorporate anti-blocking agents to reduce the tackiness of the sealant layer. The anti-blocking agents can be calcium carbonate, talc, silica or other suitable materials.

Figure 2:
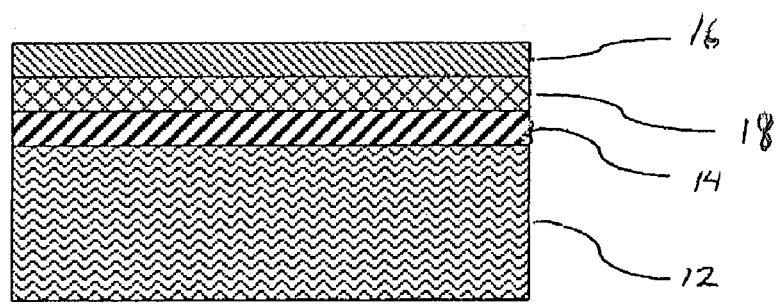
FIG. 2 depicts the laminate with a tie layer between the tear-resistant polymer layer and heat seal polymer layer.

FIG. 2 depicts the laminate with the use of a tie layer 18 between the tear-resistant polymer layer 14 and heat sealable polymer layer 16 such as tie material coatings marketed under the trademark TYMOR, or more specifically, TYMOR 1205 having a coating weight on the order of 4 pounds per 3000 square foot ream. The tie material coating marketed is a polyethylene backbone polymer with functional groups grafted thereon, such as maleic anhydride copolymer. Suitable tie layer are selected from the group of materials including polymers grafted with species such as maleic anhydride. Film weights are from 1 to 12 pounds per 3000 ft$^2$, preferably from 1 to 3 pounds per 3000 ft$^2$.

Figure 3:
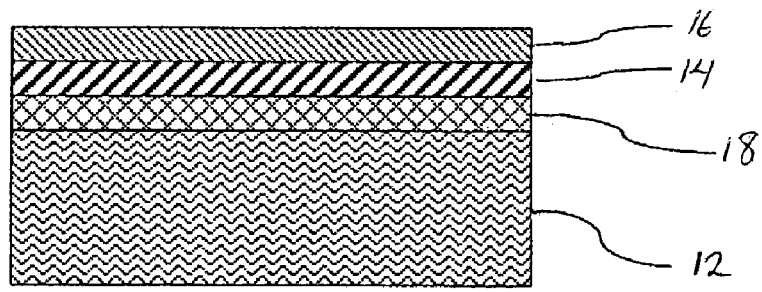
FIG. 3 is a view of the laminate having a tie layer between the paperboard and tear-resistant polymer.
Figure 4:
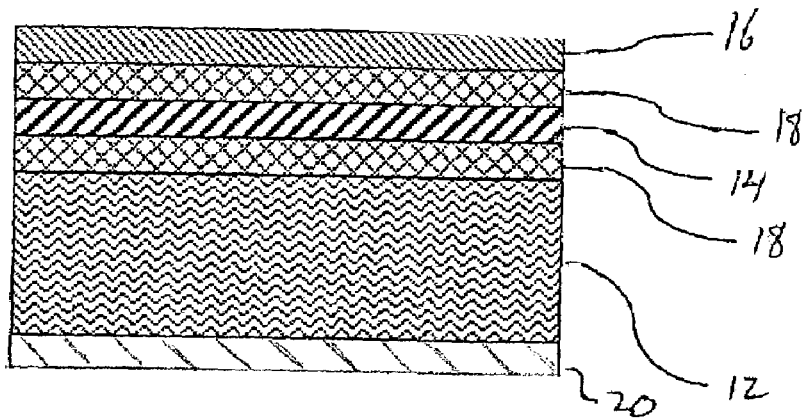
FIG. 4 depicts the laminate having a tear layer between both the paperboard and tear-resistant layer and the tear-resistant layer and heat sealable polymer.

FIG. 3 depicts a laminate using a tie layer 18 between the paperboard layer 12 and tear-resistant polymer layer 14. Likewise, FIG. 4 depicts a laminate having a tie layer 18 between both the paperboard layer 12 and tear-resistant polymer layer, and between the tear-resistant polymer layer 14 and heat sealable polymer layer 16. A clay coating can be formed on the side of the paperboard substrate opposite the tear-resistant and heat seal polymers to improve print quality.

The laminate tear strength can be controlled by varying the film weight of the tear-resistant polymer layer as an increase in tear resistance results from an increase in film weight. Also, during manufacturing, die cuts or perforations may be provided in the tear-resistant polymer layer. This creates areas of controlled weakness to direct the tearing of the package limiting the direction the package can be opened.

Figure 5:
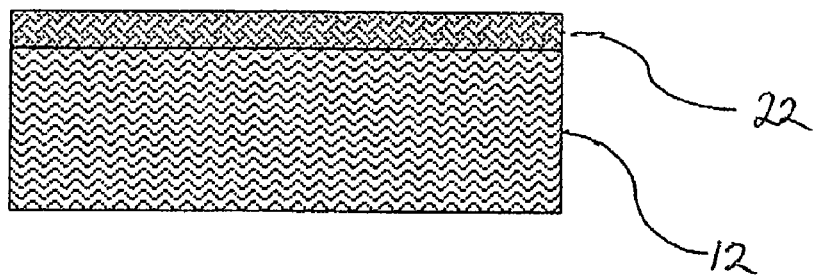
FIG. 5 depicts the substrate having an adhesion primer or adhesion inhibitor.

Also, modulating levels of adhesion between the tear-resistant polymer and the paperboard controls the amount of tear resistance. This may be done by the addition of adhesion promoting primer 22 between the paperboard 12 and tear-resistant polymer 14. Suitable materials for the adhesion promoting primer include polyethylene amine applied at between 1 and 6 pounds per 3000 ft$^2$, preferably 1 pound per 3000 ft$^2$. The adhesion primer is applied to the paperboard 12 prior to the extrusion of the tear-resistant polymer onto the substrate as is shown in FIG. 5.

Figure 6:
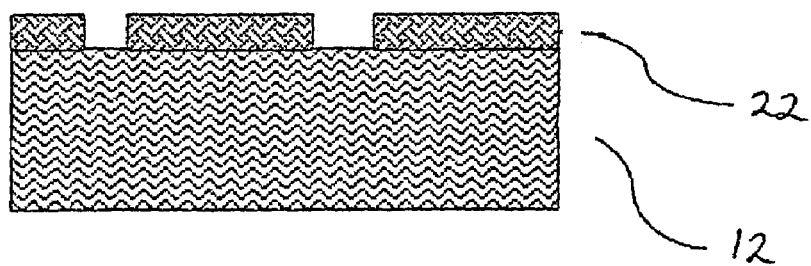
FIG. 6 depicts the substrate having a discontinuous layer of adhesive primer or adhesion inhibitor.

The adhesion promotion primer 22 may be applied in a non-continuous pattern to create differential adhesion between the tear-resistant polymer to the paperboard. Such a discontinuous pattern is shown in FIG. 6. The weaker adhesion areas created by the non-continuous pattern would dictate the steps necessary to open the package to access the contents.

Alternatively, an adhesion inhibitor may be applied between the paperboard and tear-resistant polymer. Suitable adhesion inhibitors include silicone, lacquers, or varnishes applied at between 1 and 6 pounds per 3000 ft$^2$, preferably 1 to 2 pounds per 3000 ft$^2$. The adhesion inhibitor may also be applied in a non-continuous patter to create the differential adhesion of the tear-resistant polymer to the paperboard. The differential adhesion again creates patterns that may be followed to access the contents.

Figure 7:
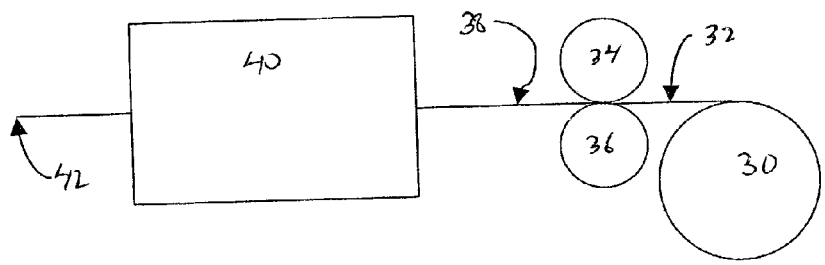
FIG. 7 shows the process for applying the adhesive primer or adhesion inhibitor to the substrate.
Figure 8:
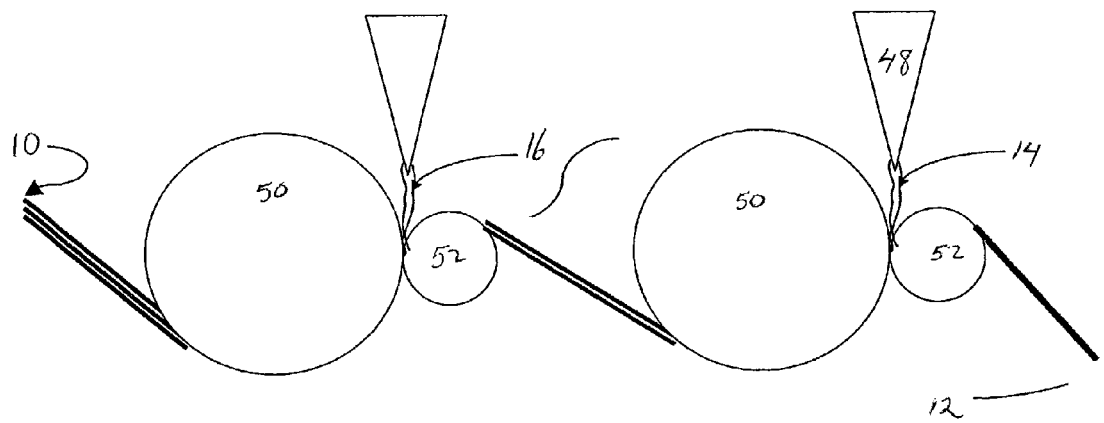
FIG. 8 shows the process for forming the laminate of the invention.

FIG. 7 depicts a method for coating the paperboard substrate with either the adhesion primer or adhesion inhibitor. A paperboard roll 30 feeds unprimed web 32 between a gravure roll 35 and backing roll 36 where either the adhesion primer or an adhesion inhibitor is applied. After application, the wet coated paperboard 38 passes through a dryer 40 and the dried primed web 42 exits from the dryer 40. Differential adhesion may also be attained by the use of a patterned nip roll on the extrusion line when the tear-resistant polymer is applied to the paperboard. This process is depicted in FIG. 8. The nip roll cooperates with the chill roll and a non-uniform pattern is created to result in areas of variable adhesion. A paperboard web 12 is fed between a chill roll 50 and a nip roll 52. A extruder drive 48 provides molten tear-resistant polymer. The resulting two layer structure is then fed between a second chill roll 50 and nip roll 52 where an extruder die applies molten heat seal polymer 16. Exiting from this second chill roll is a completed laminate 10.

The resultant laminate will bond easily as board-to-board as well as board to blister under conditions having a range temperature of 250–400 degrees Fahrenheit and pressure of 40–80 psi with a dwell times of 1 to 2 seconds. A low heat exposure results from the decreased heat seal initiation temperature and shorter dwell time. This is critical to products such as pharmaceutical, nutraceuticals and cosmetics that can be damaged by heat exposure. The bond strength of the laminate of the invention to itself and common blister materials under various seal conditions is summarized in the following table.

TABLE 1

Heat seal data for standard and tear-resistant blister constructions at various heat seal conditions.

| Temp: F. | Dwell: S | Pressure: PSI | | Standard Blister to PVC | Tear-Resistant Blister to PVC | Tear-Resistant Blister to PET | Tear-Resistant Blister to Aclar |
|---|---|---|---|---|---|---|---|
| 275 | 1 | 80 | Avg in gf | 1151 | 1612 | 1301 | 1448 |
| 300 | 1 | 80 | Avg in gf | 1380 | 1538 | 1188 | 1264 |
| 325 | 1 | 80 | Avg in gf | 1060 | 1244 | 1092 | 1515 |
| 350 | 1 | 80 | Avg in gf | 996 | 1545 | 1080 | 1424 |
| Avg of All | | | Avg in gf | 1147 | 1485 | 1165 | 1413 |
| 275 | 2 | 80 | Avg in gf | 1200 | 1811 | 1214 | 1532 |
| 300 | 2 | 80 | Avg in gf | 1365 | 1392 | 1164 | 1407 |
| 325 | 2 | 80 | Avg in gf | 1331 | 1596 | 1196 | 1326 |
| 350 | 2 | 80 | Avg in gf | 1522 | 1652 | 1213 | 1514 |
| Avg of All | | | Avg in gf | 1355 | 1613 | 1197 | 1445 |

Figure 9:
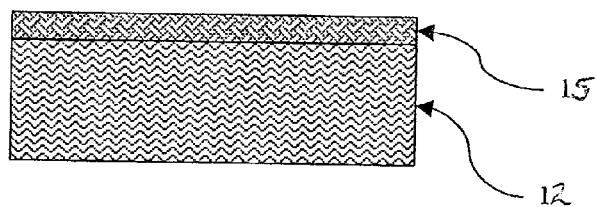
FIG. 9 shows a laminate having a combined tear resistant and heat seal polymer layer.

In an alternative embodiment of the invention, the tear-resistant polymer may be blended with a polymer possessing heat sealable qualities. In this instance, shown in FIG. 9, a single layer 15 having both tear-resistance and the ability to heat seal to the blister layer is achieved in a single layer.

In another embodiment of the invention, the tear resistant polymer may be a tear resistant polymer film laminated to the paperboard substrate. For extrusion lamination the film could be attached by a tie layer 18. The heat seal polymer is then applied to the external side of the tear resistant polymer film. In this embodiment, the film could be an oriented film such as oriented or biaxially oriented polyamide, oriented polyester and the like. A preferred embodiment is a cross oriented HDPE film marketed under the trade name Valeron with film thickness from 1 to 3 mils, preferably from 1 to 1.5 mils. The film can be laminated by adhesive or extrusion lamination. If adhesive lamination is used, any suitable liquid adhesive could be used, such as ethylene vinyl acetate, polyurethane, acrylic or acrylate polymers and the like, in place of the tie layer. The tear resistant film comprising films of polyamide, such as nylon 6, nylon(6,6), nylon(6,12) or films of other polyamides, polyester, polyurethane, block copolymer including, unsaturated block copolymers such as styrene-butadiene-styrene, styrene-isoprene-styrene and the like; saturated block copolymers such as styrene-ethylene/butylene-styrene, styrene-ethylene/propylene-styrene, and the like or other materials possessing high tear-resistant properties. The polymer film used to make the tear-resistant layer may be blended with another polymer selected from the group consisting of ethylene copolymers such as ionomers, vinyl acetate, methylacrylic or acrylic acid copolymers. The film thickness could be between 0.0005 and 0.002 inches, preferably 0.0005 inches.

Tear strengths of various preferred structures are detailed in the following table.

TABLE 2

Tear data for various tear resistant materials utilized in tear-resistant blister board construction.

| Material Composition | MD Elmendorf Tear (grams) | TD Elmendorf Tear (grams) |
| --- | --- | --- |
| 100% Polyamide | 183.36 | 203.6 |
| 75% Polyamide/25% Ionomer | 389.96 | 342.68 |
| 80% Polyamide/20% Ionomer | 423.42 | 371.06 |
| Tear Resistant Film | 1050.7 | 684.4 |

While the invention has been described with reference to a preferred embodiment, variations and modifications would be apparent to one of ordinary skill in the art after reviewing the disclosure of the invention. The invention encompasses such variations and modifications.

What is claimed is:

1. A blister pack laminate comprising:
   a substrate for providing a base layer,
   a tear-resistant polymer layer selected from the group consisting of nylon 6, nylon (6-6), nylon (6-12), polyesters, polyurethanes, block copolymers, styrene-butadiene-styrene-isoprene-styrene unsaturated block copolymers, styrene-ethylene/butylene-styrene saturated block copolymers, and blends of one or more of the aforesaid polymers with ethylene /ionomer copolymers, ethylene/vinyl acetate copolymers, ethylene/methylacrylate copolymers and ethylene/acrylic acid copolymers, applied to said substrate wherein the blister pack laminate comprises a layer of adhesion inhibitor between said substrate and tear-resistant polymer layer, and
   a heat seal polymer layer applied to said tear-resistant polymer.

2. The laminate of claim 1, wherein said substrate is paperboard.

3. The laminate of claim 1, wherein said tear resistant polymer is polyamide, polyester, polyurethane or block copolymer.

4. The laminate of claim 1, wherein said heat seal polymer layer is EVA, EMA, ionomers or acrylic copolymers, or acrylate copolymers.

5. The laminate of claim 1, wherein said heat seal polymer layer has anti-blocking agents to reduce the tackiness of the heat seal polymer layer.

6. The laminate of claim 5, wherein said anti-blocking agents comprise calcium carbonate, talc or silica.

7. The laminate of claim 1, further comprising a clay coating applied to said substrate on a side opposite said tear-resistant polymer layer.

8. The laminate of claim 1, further comprising a tie layer between said tear-resistant layer and said heat seal polymer layer.

9. The laminate of claim 1, further comprising a layer of adhesive primer between said substrate and tear-resistant polymer layer.

10. The laminate of claim 9, wherein said adhesive primer is a discontinuous layer.

11. The laminate of claim 9, wherein said adhesive primer is applied with a nip roll.

12. The laminate of claim 9, wherein said adhesive primer is polyethylene amine.

13. The laminate of claim 1, wherein said adhesion inhibitor is a discontinuous layer.

14. The laminate of claim 1, wherein said adhesion inhibitor is applied with a nip roll.

15. The laminate of claim 1, wherein said adhesion inhibitor comprises silicone.

16. A blister pack laminate comprising:
   (a) a substrate for providing a base layer;
   (b) a tear resistant polymer layer selected from the group consisting of (i) polyamides, (ii) polyesters, (iii) polyurethanes, (iv) block copolymers, (v) unsaturated block copolymers, (vi) saturated block copolymers and blends of one or more of the aforesaid polymers with ethylene copolymers, applied to said substrate wherein the blister pack laminate comprises a layer of adhesion inhibitor between said substrate and tear-resistant polymer layer; and
   (c) a heat seal polymer layer applied to said tear-resistant polymer.

* * * * *